United States Patent Office 3,234,309
Patented Feb. 8, 1966

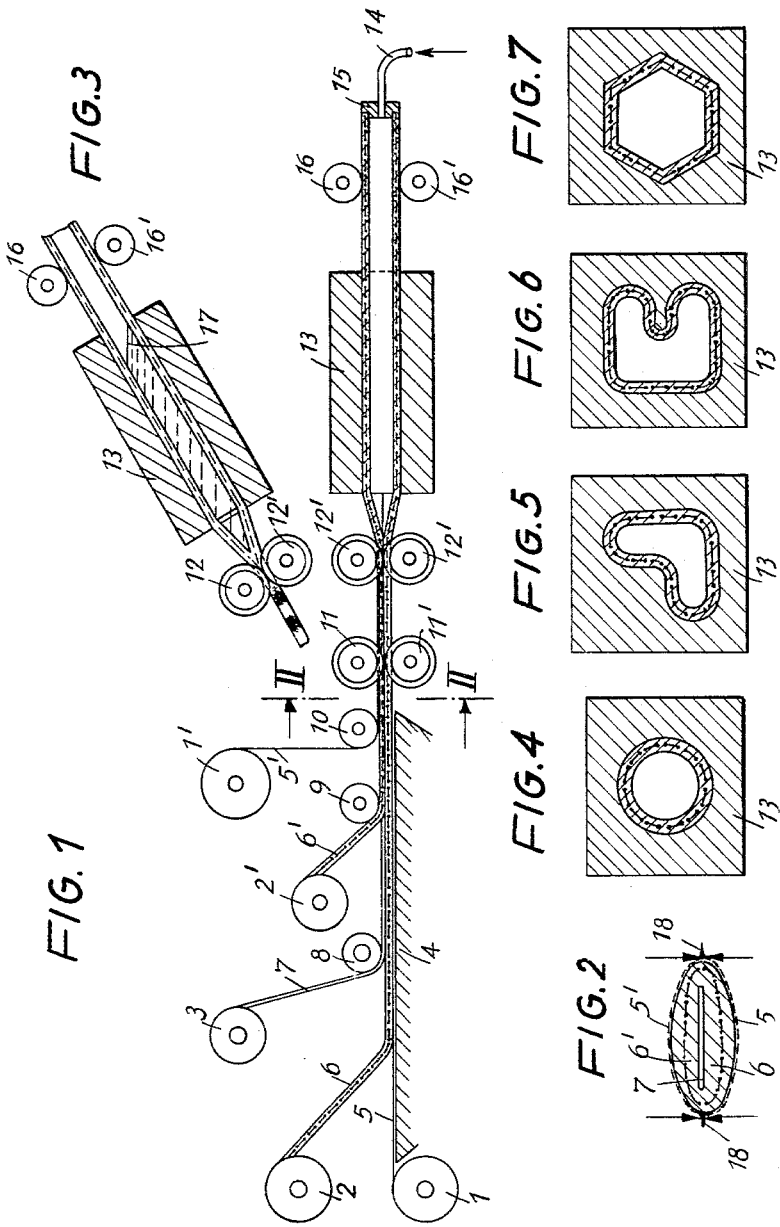

3,234,309
METHOD OF PRODUCING REINFORCED
TUBULAR PLASTICS
Roderich W. Gräff, Burgberg, Villingen, Black Forest,
Germany, assignor to Deutsche Tafelglas Aktiengesellschaft Detag, Furth, Bavaria, Germany
Filed Nov. 22, 1961, Ser. No. 154,188
Claims priority, application Germany, Nov. 25, 1960,
D 34,816
20 Claims. (Cl. 264—95)

The present invention relates to a method for continuously producing tubular goods of plastics, the walls of which are provided with reinforcing inserts, for example, of glass fabrics, glass fiber mats or the like. Such a method is of extremely great importance, especially in view of the rapidly increasing requirement in many different fields for hollow molded goods of plastics since by reinforcing the walls of such goods, they may also be applied for purposes in which the plastic goods must possess very good mechanical properties.

The prior art already discloses several methods for producing reinforced goods of plastics and also such goods of a tubular shape. According to some of these methods the reinforcing material consisting of endless threads, for example, glass filaments, is passed through a bath containing a liquid resin pre-condensate and is thereafter passed through a heated metallic nozzle of a cross-sectional shape in accordance with the shape of the desired product. In this nozzle the liquid resin is cured under the influence of added catalysts so that the desired cross-sectional shape of the product will be attained. After the finished cured material has emerged from the nozzle, it may be cut to the desired lengths. If a core is provided at the center of the nozzle, it is in this manner also possible to produce materials and goods of a tubular shape.

This known method which employs endless, resin-impregnated threads has the serious disadvantage that the reinforcing effect, for example, a high tensile strength, extends essentially only in the longitudinal direction, that is, in the direction of the threads. The buckling, compressive, and torsional strength, and especially the shearing resistance in a direction vertical to the threads are, however, relatively low.

For this reason, the production of reinforced molded plastic goods has already been carried out by employing webs or fabrics which are embedded in the wall of the molded article. These prior methods employing flat reinforcing inserts do, however, not permit the production of tubular goods, for example, pipes, and such goods cannot even be produced by the last-mentioned method according to which the resin-impregnated reinforcing material is drawn through a nozzle because the webs or fabrics would then be completely disarranged and torn apart.

It is an object of the present invention to satisfy the urgent need or a satisfactory method of manufacturing reinforced tubular plastic goods. According to the invention this object is attained by first applying a sheet or strip of reinforcing material, for example, in the form of a web or fabric, as well as a liquid resin pre-condensate upon the outer side of a plastic tube which is made of a flexible thermoplastic and is folded together in its longitudinal direction so as to form a flat web and by then applying thereon one or more outer covering sheets or strips which consist likewise of a flexible thermoplastic and have a size so as at least to cover the resin-impregnated reinforcing material. The stack of several layers which is thus formed is thereafter drawn—preferably in a continuous operation—through a heated hollow mold which has a mold chamber of a shape in accordance with the outer shape of the desired tubular product, and during this process the plastic tube is expanded by exerting a higher pressure upon the inner side of the tube, whereby the individual layers of the stack are pressed against the wall of the mold chamber. Hereafter the resin condensate is cured in a conventional manner and, if the method is carried out in a continuous operation, this curing process occurs during the movement of the widened stack along the wall of the mold chamber. Since the materials employed for making the plastic tube and the covering strips are flexible and thermoplastic, they will easily conform with the cross-sectional shape of the mold chamber. Under the effect of the increased pressure it is possible in this manner to expand the plastic tube and the covering strips in the heated mold to the desired extent in a direction vertical to the direction of movement and to plasticize the same at the same time.

The materials for making the plastic tube and the covering strips may consist, for example, of cellophane, polyethylene, polyvinyl chloride, or the like. The elasticity of these materials is especially of importance for producing tubular goods of a conical shape, as will be subsequently described in detail.

The reinforcing materials for the tubular goods may consist of the materials which are conventionally used for this purpose, for example, woven glass filaments or glass fiber mats. The impregnation of these materials is also carried out with conventional liquid resin pre-condensates, for example, on the base of phenoplasts and aminoplasts, epoxide resins, or polyester, which are cured by heat, possibly by the addition of catalysts. By a proper coordination of the catalyst, the activator, the temperature, the length of the molding chamber and the drawing speed it is possible to carry out the new method continuously so that, when the resin leaves the mold, it is fully cured and therefore a stable hollow product is attained which may then be cut to the desired lengths.

For some purposes it is advisable to adjust the materials for the plastic tube and the resin pre-condensates for the impregnation of the reinforcing material relative to each other in such a manner that the different materials will intimately combine with each other.

For completely removing the enclosed air from the plastic tube so as to insure that the reinforcing layers and the covering strips will easily surround the folded tube which then forms a flat layer, the plastic tube is pressed flat, for example, by rollers, before it is covered with the resin-impregnated reinforcing material. This only requires a relatively light compression of the tube upon the support.

Since it is usually required that the covering strip or strips completely enclose the plastic tube and the resin-impregnated reinforcing material, it is advisable to squeeze out any excess resin and expel the air which is enclosed in the stack before the latter enters into the mold. For this purpose, suitable compression tools, for example, rollers, are employed. Either at the same time or subsequently thereto the edges of the covering strip or strips may be connected to each other, for example, by cementing or welding. The welding operation may be carried out, for example, by means of heated rollers which are provided with suitable shoulders. If the covering element consists of a single strip of a greater width the plastic tube which forms a flat web is wrapped up therein, and thereafter the edges of the covering strip are connected to each other in the manner as already described. It is, however, also possible to apply two covering strips which cover up the upper and lower sides of the flattened tube, respectively. In the event that the covering strips have such a width that, after the longitudinal edges have been connected, there are any portions projecting from the stack, these portions will be cut off by suitable cutting means.

The increased pressure within the tubular portion which is disposed within the mold chamber may be generated, for example, by injecting into the tube a gas under pressure, for example, compressed air, from the end of the tubular section which is already cured. Naturally, the tube must for this purpose be closed tightly at a point immediately before its entry into the mold chamber, and also the end of the finished product emerging from the mold must be closed hermetically. For the first-mentioned purpose, rollers may be employed which are located in front of the mold and will also squeeze off any excessive resin and may, if necessary, also weld the edges of the covering sheets. Obviously, there are no difficulties in hermetically closing the end of the tubular section which is already cured.

If in the method according to the invention a pressure gas is employed, this has, however, the disadvantage that the operation must be interrupted from time to time for a short period since in order to permit the finished section to be cut off, the supply of pressure gas must obviously also be interrupted.

A fully continuous operation of the method according to the invention, in which the tubular reinforced material is drawn off continuously, consists in inserting the stack from below into a perpendicular or oblique mold and in producing the pressure within the plastic tube by filling it with a material which is capable of flowing by gravity, for example, sand or a liquid. By making the mold of a suitable length, by mounting it at a suitable angle, and by employing a filling material of a suitable specific gravity, it is then possible to produce any desired pressure within the mold.

The method according to the invention is not limited to the production of tubular goods of a regular cross section, for example, pipes, but it may also be applied for producing tubular goods of an irregular cross section or of tubular parts with lateral projections. This only requires that the web which is formed by the flattened plastic tube within the stack which is fed toward the mold is made narrower than the webs which consist of the resin-impregnated reinforcing material and the covering strip or strips, and that the section of the mold chamber which surrounds the laterally projecting parts of the stack is made of a cross-sectional shape in accordance with the desired shape of these parts and is connected with the section of the mold which forms the tubular part.

The method according to the invention further permits the manufacture of tubular plastic goods in which partitions are provided along their entire length. For this purpose, several folded tubes are arranged side-by-side and/or above each other in the stack which is fed toward the mold, and a web consisting of a resin-impregnated reinforcing material is drawn between each pair of superimposed tubes. In each of these tubes a pressure is then exerted within the mold. After the plastic tubes have been expanded and cured, the intermediate layers of resin-impregnated reinforcing material then form the partitions within the tubular product, whereby separate channels are produced in accordance with the number of individual tubes applied. The compressive strength of the reinforcing material is sufficient to maintain the individual plastic tubes in the proper position.

Finally, the method according to the invention also permits the manufacture of tubular conical parts which, if desired, may also be provided with shoulders or recesses. For this purpose a mold may be used, the chamber of which has a cross-sectional shape which varies in the longitudinal direction in accordance with the desired shape of the product, although obviously it may for a certain length also be of a uniform cross section so that the goods produced will have parts of a conical and of a cylindrical cross section. The operation of drawing out the conical products is carried out intermittently.

By varying the types of reinforcing materials, it is possible according to the invention also to manufacture tubular products with walls of any desired thicknesses and of different solidity. Furthermore, certain parts, for example, the ends of the product, may be made stronger than the other parts or be provided with a thicker reinforcing insert. It is also possible according to the invention to make products of a complicated shape, for example, of a larger cross-sectional area, for example, a polygonal shape, since due to the pressure at the inside of the plastic tube, the tube and the other layers of the stack will adapt themselves to a mold of the most complicated shape.

The outer sheets or strips applied according to the inventive method may consist of a material which permits them to be pulled off after the tubular articles is produced, or they may consist of a material which intimately combines with the resin so that the covering strips will finally form an integral part of the finished product.

The objects, features, and advantages of the present invention will become more clearly apparent from the following detailed description thereof which is to be read with reference to the accompanying drawings, in which—

FIGURE 1 shows diagrammatically a longitudinal section of an apparatus for carrying out the inventive method by the application of a pressure gas to the inside of the plastic tube;

FIGURE 2 shows a cross section taken along line II—II of FIGURE 1;

FIGURE 3 shows a longitudinal section of a mold for carrying out the inventive method in a modified manner by employing a material which is capable of flowing by gravity for expanding the plastic tube, and it also shows the stack as already being expanded within the mold;

FIGURES 4 to 7 show examples of the cross-sectional shapes of different molds for producing tubular goods of different shapes, and they also show the expanded stacks in cross section within the mold;

FIGURE 14 shows a cross section of the flat stack of layers for producing the goods according to FIGURE 13; while

Figure 8:
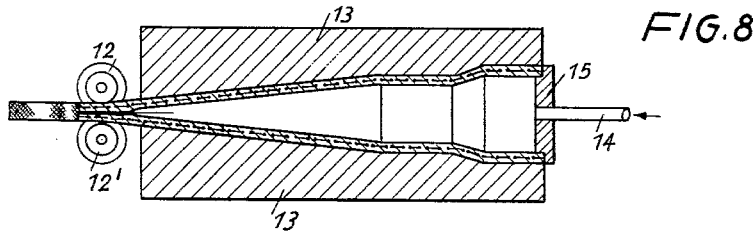
FIGURE 8 shows a longitudinal section of a mold for producing tubular plastic goods of a conical shape.

Referring first particularly to FIGURE 1 of the drawings, the individual layers of material which are required to form the stack which is fed toward the mold are drawn off the rolls 1, 1', 2, 2', and 3. In order to place the individual layers into the desired position relative to each other the covering strip 5 is first fed from roll 1 to the support 4 on which the stack is compiled. From the roll 2 the resin-impregnated reinforcing material 6 is then applied upon the covering strip 5, and upon this material 6 the folded or flattened plastic tube 7 coming from roll 3 is placed. By the pressure of a roller 8, layers 5, 6, and 7 are pressed upon each other, whereby at the same time the air contained in tube 7 will be expelled. Tube 7 which behind roller 8 forms a flat web is then covered by a further layer of resin-impregnated reinforcing material 6' which is drawn from roll 2', and this layer 6' is then, in turn, covered by a further covering strip 5' which is drawn from roll 1'. Guide rollers 9 and 10 feed and properly guide the layers 6' and 5'.

The subsequent rollers 11, 11' and 12, 12' which are mounted in pairs at opposite sides of the stack squeeze off any excessive resin and expel the air which might still be enclosed in the resin. These rollers may also be provided with suitable shoulders or the like for welding the edges of the covering strips together. Behind the pair of rollers 12 and 12' the stack passes into the mold 13 in which the stack is opened up and expanded by the injection of a pressure gas into the inside of tube 7. The pressure gas is supplied into tube 7 through a line 14 and a plug 15 which is inserted into the open end of the tubular product after it has been cured in the heated mold. By means of another pair of rollers 16 and 16' the cured product emerging from mold 13 is drawn off continuously. The operation needs to be interrupted only if a piece of the cured product is to be cut off behind mold 13 which would require the temporary removal of feed line 14 with plug 15.

The modification of the invention as illustrated in FIGURE 3 differs from the embodiment according to FIGURE 1 only by the fact that mold 13 is mounted at an oblique angle and that the stack which is then inserted into the mold from below is opened up and widened by means of a material 17 which is capable of flowing by gravity, such as sand or a liquid, and which is filled into tube 7 through the cured open end thereof.

The modification of the mold as illustrated in FIGURE 8 serves for producing a reinforced tube with conical and cylindrical sections in accordance with the inventive method. The mold chamber is therefore provided with an inner wall of a corresponding shape which first tapers outwardly in the longitudinal direction and then has two cylindrical portions which are separated by another tapering portion.

Figure 10:
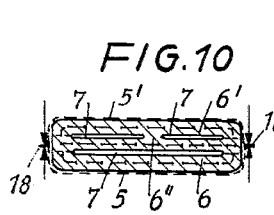
FIGURE 10 shows a cross section of the flat stack of layers before it enters the mold as shown in FIGURE 9.
Figure 9:
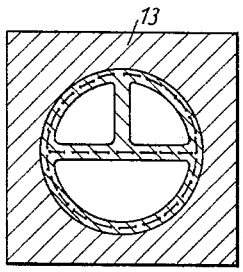
FIGURE 9 shows a cross section of a mold for producing tubular plastic goods with partitions forming separate channels.
Figure 11:
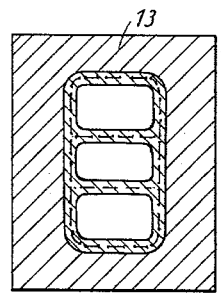
FIGURE 11 shows a cross section of a mold for producing tubular plastic goods of a different shape and also provided with partitions.
Figure 12:
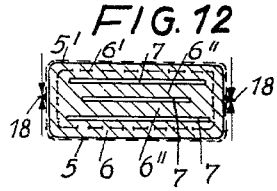
FIGURE 12 shows a cross section of the flat stack of layers before it enters the mold according to FIGURE 11.

FIGURES 9 and 11 show cross sections of two different molds with tubular reinforced articles therein which are provided with reinforced partitions forming several separate channels, while FIGURES 10 and 12 show the flat stacks before entering the molds according to FIGURES 9 and 11, respectively. The channels within the outer tube are produced according to the invention by applying several plastic tubes 7 above each other and/or laterally of each other and by separating the superimposed tubes 7 by resin-impregnated layers 6" of reinforcing material.

Figure 14:
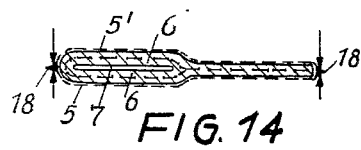
Figure 13:
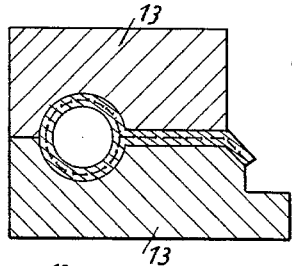
FIGURE 13 shows a cross section of a mold for producing tubular goods with a lateral solid projection thereon.
Figure 15:
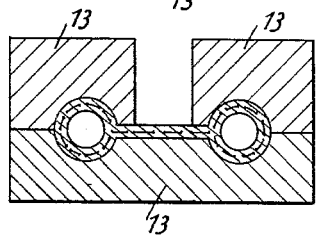
FIGURE 15 shows a mold for producing two tubular articles which are connected by a reinforced web.

The tubular article according to FIGURES 13 and 14 is produced by covering the flat plastic tube 7, as shown in FIGURE 14 in the manner as previously described with layers of resin-impregnated reinforcing material 6 and 6' and outer covering layers 5 and 5'. These layers 6, 6' and 5, 5' are however, wider at one side than the plastic tube 7 so that after tube 7 is expanded in mold 13, the part which is laterally projecting from tube 7 forms a solid strip.

FIGURE 13 finally shows a mold with two reinforced tubular plastic parts which are joined by a solid reinforced strip. The method of producing plastic goods of such a shape is the same as that described with reference to FIGURES 13 and 14.

The welded edges of covering strips 5 and 5' are indicated in FIGURES 1, 10, 12 and 14 by the numeral 18.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing fiber-reinforced, and especially glass-fiber reinforced tubular goods for tubes made of plastics, in which the reinforcing material which is impregnated with synthetic resin is applied upon the plastic tube and then covered with an outer plastic layer, and the body thus formed is expanded in a mold by internal pressure, characterized by the fact that the body subsequently forming the desired tubular product is first produced in a striplike shape by continuously applying a reinforcing material upon both sides of a plastic tube which is folded in its longitudinal direction so as to form a substantially flat strip, that the reinforcing material is impregnated with synthetic resin, and covered with a plastic outer layer, and that the striplike body thus formed is then continuously moved into a mold in which an internal pressure is exerted upon said body to mold the same to the desired tubular shape.

2. A method as defined in claim 1, characterized by the fact that the plastic tube consists of a material which intimately combines with the resin pre-condensate while the latter is being cured.

3. A method as defined in claim 1, characterized by the fact that the plastic tube before being completely covered peripherally by the resin-impregnated reinforcing material is flattened by means of suitable pressure-exerting tools.

4. A method as defined in claim 1, characterized by the fact that, before the stack enters into the mold, the excessive resin is squeezed off and the air enclosed in the stack is expelled by means of suitable pressure-exerting tools.

5. A method as defined in claim 1, characterized by the fact that the pressure exerted within the plastic tube is produced by injecting a pressure gas into the tube.

6. A method as defined in claim 5, characterized by the fact that the pressure gas is injected into the plastic tube at the end thereof which is already cured.

7. A method as defined in claim 1, characterized by the fact that the stack is inserted from below into the mold which is mounted in a vertical or oblique position, and that the pressure within the plastic tube is produced by a material which is capable of flowing by gravity and which is filled into the tube.

8. A method as defined in claim 1, characterized by the fact that the outer covering layer consists of a sheet which is wrapped around the flattened plastic tube, and that before the tube is expanded, the edges of this sheet are connected to each other.

9. A method as defined in claim 1, characterized by the fact that the outer layer for covering the upper and lower sides of the plastic tube comprises a pair of outer strips and the longitudinal edges of said strips being connected to each other.

10. A method as defined in claim 8, characterized by the fact that the edges of the outer covering layer are connected to each other after the excessive resin is squeezed off and the air enclosed in the stack is expelled.

11. A method as defined in claim 1, characterized by the fact that the outer covering layer consists of a material which intimately combines with the resin while the resin pre-condensate is being cured.

12. A method as defined in claim 1, characterized by the fact that the layer formed in the stack by the flattened tube is narrower than the layers formed by the resin-impregnated reinforcing material and the outer covering layer or covering strips, and that the part of the mold chamber adapted to enclose the parts of the stack projecting laterally from the tubular part thereof has a cross-sectional shape adapted to mold said projecting parts into a lateral solid extension of said tubular part.

13. A method as defined in claim 1, characterized by the fact that the stack contains several flattened superimposed tubes, and that between each two superimposed tubes a layer of a resin-impregnated reinforcing material is inserted, and that during the molding and curing process in the mold an internal pressure is exerted upon each tube.

14. A method as defined in claim 1, characterized by the fact that the mold chamber is of a conical shape and the steps of expanding the plastic tube and curing the resin, and withdrawing of the conical product are carried out intermittently.

15. A method as defined in claim 1, characterized by the fact that the reinforcing material consists of glass fibers.

16. A method of producing a hollow article of fiber-reinforced hardenable synthetic resin, comprising forming two layers of fiber-reinforced fluid hardenable synthetic resin, interposing at least one flexible flattened tube of synthetic material between said two layers to form a laminate, continuously moving said laminate into a hollow molding means, applying an internal expanding pressure to the interior of said flattened tube to expand the tube and thereby to press the laminate against the interior walls of said molding means, applying heat to the expanded moving laminate until cured and continuously withdrawing the so cured hollow article from said molding means.

17. A method of producing a hollow article from a fluid hardenable fibrous material reinforced synthetic resin and a synthetic material web which comprises the steps of conveying a first film web of said synthetic material, depositing a first layer of said fiber-reinforced fluid hardenable synthetc resin upon said first film web, flattening at least one tube of flexible synthetic material, depositing said flattened tube upon said first layer, depositing a second layer of fiber-reinforced fluid hardenable synthetic resin upon said flattened tube, covering said second layer by a second film web to form a wrapped laminate, continuously moving said laminate into a hollow molding means, applying internal pressure to the interior of said flattened tube, expanding said laminate by said internal pressure to press it against the interior walls of said hollow molding means so as to form a hollow article, at least partly curing the fluid hardenable resin of said laminate within the mold by applying heat thereto and continuously withdrawing said so cured hollow article from said molding means.

18. A method of producing a hollow article from reinforcing fibrous material impregnated with a fluid hardenable synthetic resin, which comprises the steps of conveying a first film web of synthetic material, depositing a first layer of fiber reinforced fluid hardenable synthetic resin upon said first film web, flattening a tube of flexible synthetic material, depositing a second layer of fiber reinforced fluid hardenable synthetic resin upon said flattened tube to form a laminate, covering said second layer by a second film web, squeezing off from the laminate excessive resin and entrapped air by pressure exerting means, tightening the overlying edges of said two film webs so as to completely wrap the laminate, inserting said laminate into a hollow molding means, applying internal pressure to the interior of said flattened tube, expanding said laminate by said internal pressure to press it against the interior walls of said molding means so as to form a hollow article, at least partly curing the fluid hardenable resin of said laminate within said molding means by applying heat thereto, and withdrawing said cured molded laminate from said molding means.

19. A method of producing a hollow article from reinforcing fibrous material impregnated with a fluid hardenable synthetic resin, which comprises the steps of conveying a first film web of synthetic material, depositing a first layer of fiber reinforced fluid hardenable synthetic resin upon said first film web, flattening a plurality of tubes of flexible synthetic material, depositing said flattened tubes spaced apart from each other upon said first layer, depositing a second layer of fiber reinforced fluid hardenable synthetic resin upon said flattened tubes, covering said second layer by a second film web to form a wrapped laminate, squeezing off from the laminate excessive resin and entrapped air by pressure exerting means, tightening the overlying edges of said two film webs so as to completely wrap the laminate, inserting said laminate into a hollow molding means, applying internal pressure to the interior of each of said flattened tubes, expanding said laminate by said internal pressure to press it against the interior walls of said hollow molding means so as to form a hollow article with a plurality of parallel channels separated by partitions, at least partly curing the fluid hardenable resin of said laminate within said molding means by applying heat thereto and withdrawing said so cured hollow article from said molding means.

20. A method of producing a hollow article from reinforcing fibrous material impregnated with a fluid hardenable synthetic resin, which comprises the steps of conveying a first film web of synthetic material, depositing a first layer of fiber reinforced fluid hardenable synthetic resin upon said first film web, flattening a tube of flexible synthetic material, depositing said flattened tube upon said first layer, depositing a second layer of fiber reinforced fluid hardenable synthetic resin upon said flattened tube, to form a laminate, covering said second layer by a second film web, squeezing off from the laminate excessive resin and entrapped air by pressure exerting means, tightening the overlying edges of said two film webs so as to completely wrap the laminate, inserting said laminate into a hollow molding means, applying internal pressure to the interior of said flattened tube by the static pressure of a column of a fluid medium, expanding said laminate by said internal pressure to press it against the interior walls of said molding means so as to form a hollow article, at least partly curing the fluid hardenable resin of said laminate within said molding means, by applying heat thereto and withdrawing said cured molded laminate from said molding means.

References Cited by the Examiner

UNITED STATES PATENTS

| | | | |
|---|---|---|---|
| 2,732,882 | 1/1956 | Kuts | 156—289 |
| 2,937,436 | 5/1960 | Butler et al. | |
| 3,028,291 | 4/1962 | Roberts et al. | 156—142 |
| 3,135,640 | 6/1964 | Kepka et al. | 156—147 |

EARL M. BERGERT, *Primary Examiner.*